United States Patent [19]
Shannon

[11] 3,866,834
[45] Feb. 18, 1975

[54] CULTIVATOR ASSEMBLY

[76] Inventor: Jefferson C. Shannon, c/o Shannon Tractor Co., Inc., P.O. Box 808, Yazoo City, Miss. 39194

[22] Filed: Aug. 29, 1973

[21] Appl. No.: 392,482

[52] U.S. Cl. ................. 239/167, 47/1.44, 172/509, 239/172
[51] Int. Cl. ...................... A01m 7/00, A01m 15/00
[58] Field of Search ........................... 239/159–169, 239/172–175, 178, 212; 47/1.44, 1.7; 172/509, 513

[56] References Cited
UNITED STATES PATENTS

| | | | |
|---|---|---|---|
| 559,042 | 4/1896 | Potter | 239/175 X |
| 2,569,194 | 9/1951 | Pool et al. | 47/1.44 |
| 3,223,330 | 12/1965 | La Plante | 239/168 |
| 3,435,785 | 4/1969 | Harbolt | 239/159 X |
| 3,544,009 | 12/1970 | Schlueter | 239/159 X |
| 3,595,321 | 7/1971 | Dickey | 172/513 |
| 3,625,428 | 12/1971 | Mecklin | 239/166 |
| 3,727,346 | 4/1973 | Kramer | 47/1.44 |

Primary Examiner—Lloyd L. King
Assistant Examiner—Andres Kashnikow

[57] ABSTRACT

A cultivator assembly for treating adjacent crop rows in which a mounting bracket is secured to a cultivator frame, and a parallelogram linkage provided by a pair of spaced substantially parallel wing arms, pivotally connect a side frame to each side of the mounting bracket, the side frames being adapted for location at the sides of adjacent crop rows, and having ground-engaging members for following the contour of the ground. Crop-treating devices such as flame or spray nozzles are carried by the side frames for treating the adjacent crop rows. Each side frame includes a pair of substantially vertical post members spaced in the direction of frame travel, and a pair of substantially horizontal pivot members extending between the post members, the pivot members being substantially vertically spaced. The mounting bracket includes at each side, a pair of substantially horizontal pivot members, the last said pivot members being vertically spaced. The parallelogram linkage includes a pair of parallel wing arms extending between and interconnecting the pivot members of each side frame and the pivot members on the associated side of the bracket. A fender is pivotally connected to each side frame for enabling substantially vertical movement of the fender to follow the ground contour. A brace assembly extends between and interconnects the fenders rearwardly of the pivotal connection of the fenders to the side frames, the brace assembly enabling separate and independent substantially vertical movement of the fenders while maintaining the fenders in a predetermined laterally spaced relationship.

11 Claims, 3 Drawing Figures

CULTIVATOR ASSEMBLY

BACKGROUND OF THE INVENTION

This invention relates to an improvement in a cultivator assembly for treating row crops such as cotton, soybeans, and the like, and more particularly for treating adjacent crop rows.

It will be understood that where premerge chemicals are applied at planting time to form a sterile band on top of the row along the side of the plants, it is desirable at times either to (1) not disturb the band, (2) add chemicals to the band and destroy the weeds, (3) cultivate and destroy the band and weeds, and (4) spray broadcast during lay-by operation. The present cultivator assembly performs these postemerge operations.

The prior devices of this type are mounted on the cultivator frame for location on opposite sides of the same crop row. In order to maintain the pair of associated fenders in laterally spaced relation on opposite sides of the same crop row, a cross brace bridges and interconnects the fenders. Obviously, when such a cross brace is utilized, the use of the assembly is limited to a particular crop height because the cross brace will otherwise interfere with the crop. When the cross brace is not utilized, the associated fenders on opposite sides of the same crop row can swing laterally and thereby vary the relative lateral spacing of the fenders which could adversely effect the treatment of the crop by any flame or spray nozzle carried by the fenders.

SUMMARY OF THE INVENTION

The present cultivator assembly is adapted to travel along and treat adjacent crop rows, and thereby enables the side frames and associated fenders to be directly connected and maintained in a predetermined laterally spaced relation to assure the accurate and appropriate placement of the crop-treating devices such as flame or spray nozzles. With this assembly, the interconnecting structure between the side frames and associated fenders does not bridge the crop row and accordingly, does not interfere with the crop or limit the usage of the assembly with a particular crop height.

The cultivator assembly includes a mounting bracket secured to a cultivator frame, and a side frame spaced laterally from each side of the mounting bracket for location at the sides of adjacent crop rows, the side frames having ground-engaging members for following the contour of the ground. A pair of spaced, substantially parallel wing arms pivotally connect each side frame to the mounting bracket to provide a parallelogram linkage that enables independent, substantially vertical movement of the side frames in response to ground contour. A crop-treating means is carried by the side frames for treating the adjacent crop rows.

A tension spring can be operatively connected to each side frame which would tend to exert an upward counterbalancing force on the side frame, thereby facilitating the movement of the side frame in following the ground contour without causing any serious disturbance to the soil.

Each side frame includes a pair of substantially vertical post members spaced in the direction of frame travel, and a pair of substantially horizontal pivot members extending between the post members, the pivot members being substantially vertically spaced. The mounting bracket includes at each side, a pair of substantially horizontal pivot members, the last said pivot members being substantially vertically spaced. The pair of wing arms connecting each side frame to the mounting bracket, extend between and interconnect the pivot members of each side frame and the pivot members on the associated side of the bracket.

A fender is pivotally attached to each side frame and extends rearwardly in the direction of travel, the fenders being adapted for location at the sides of adjacent crop rows. The fenders engage and are pivotally movable to follow the ground contour. Crop-treating means can be carried by the fenders for treating the adjacent crop rows.

A brace assembly extends between and interconnects the fenders rearwardly of the connection of the fenders to the side frames. This brace assembly holds the fenders in a predetermined laterally spaced relation. The brace assembly is pivotally connected to the fenders for enabling separate and independent, substantially vertical movement of the fenders while maintaining this laterally spaced relationship.

The brace assembly includes a support member attached to the cultivator frame, and a pair of cross bars, each of which is pivoted to the support member, one of the cross bars being pivoted to one fender and the other cross bar being pivoted to the other fender.

DESCRIPTION OF THE PREFERRED EMBODIMENT

Figure 1:
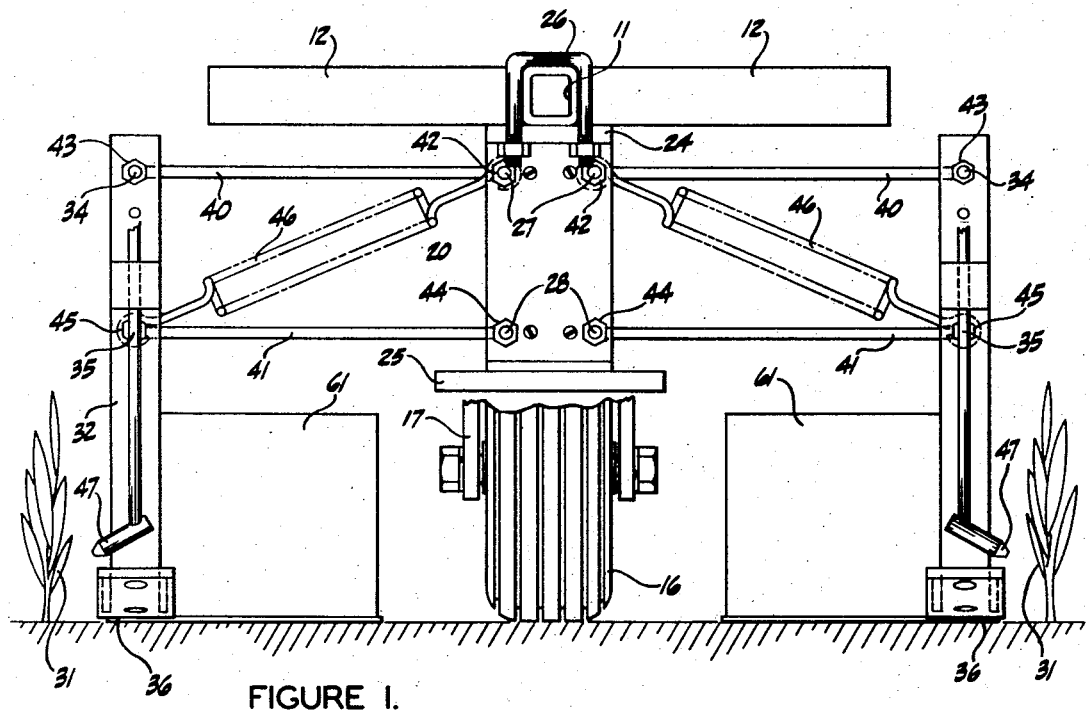
FIG. 1 is front elevational view of the cultivator assembly.
Figure 2:
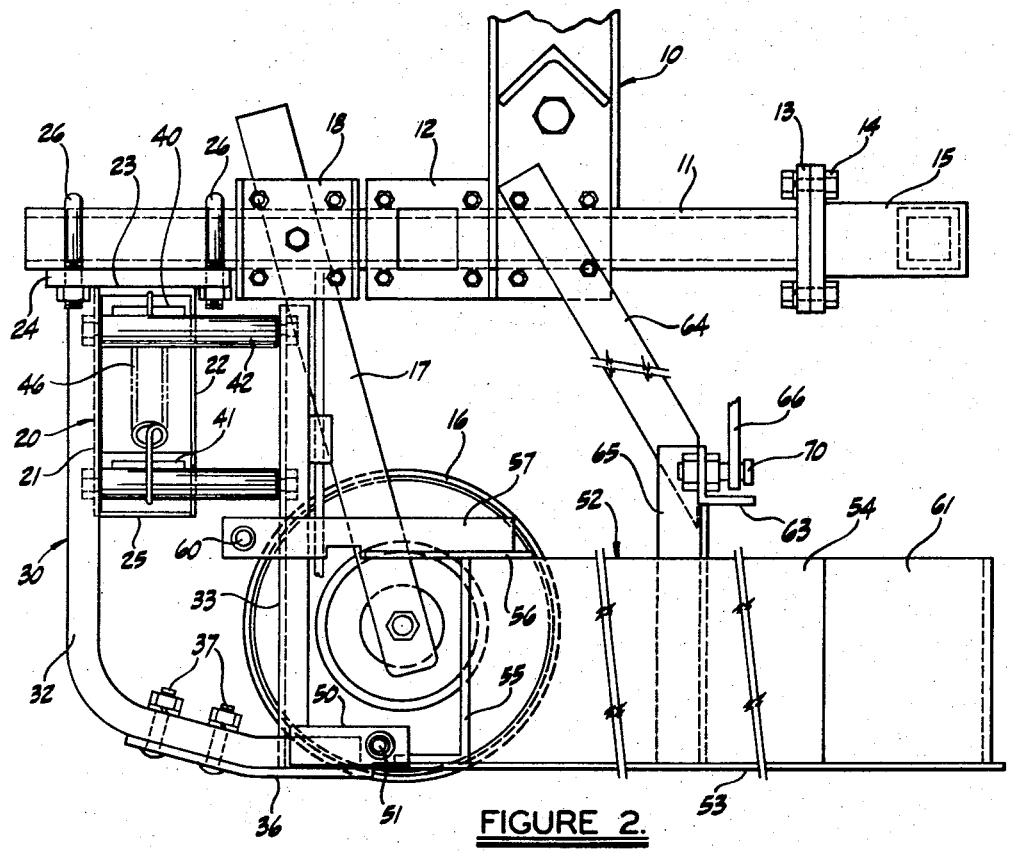
FIG. 2 is a side elevational view thereof.
Figure 3:
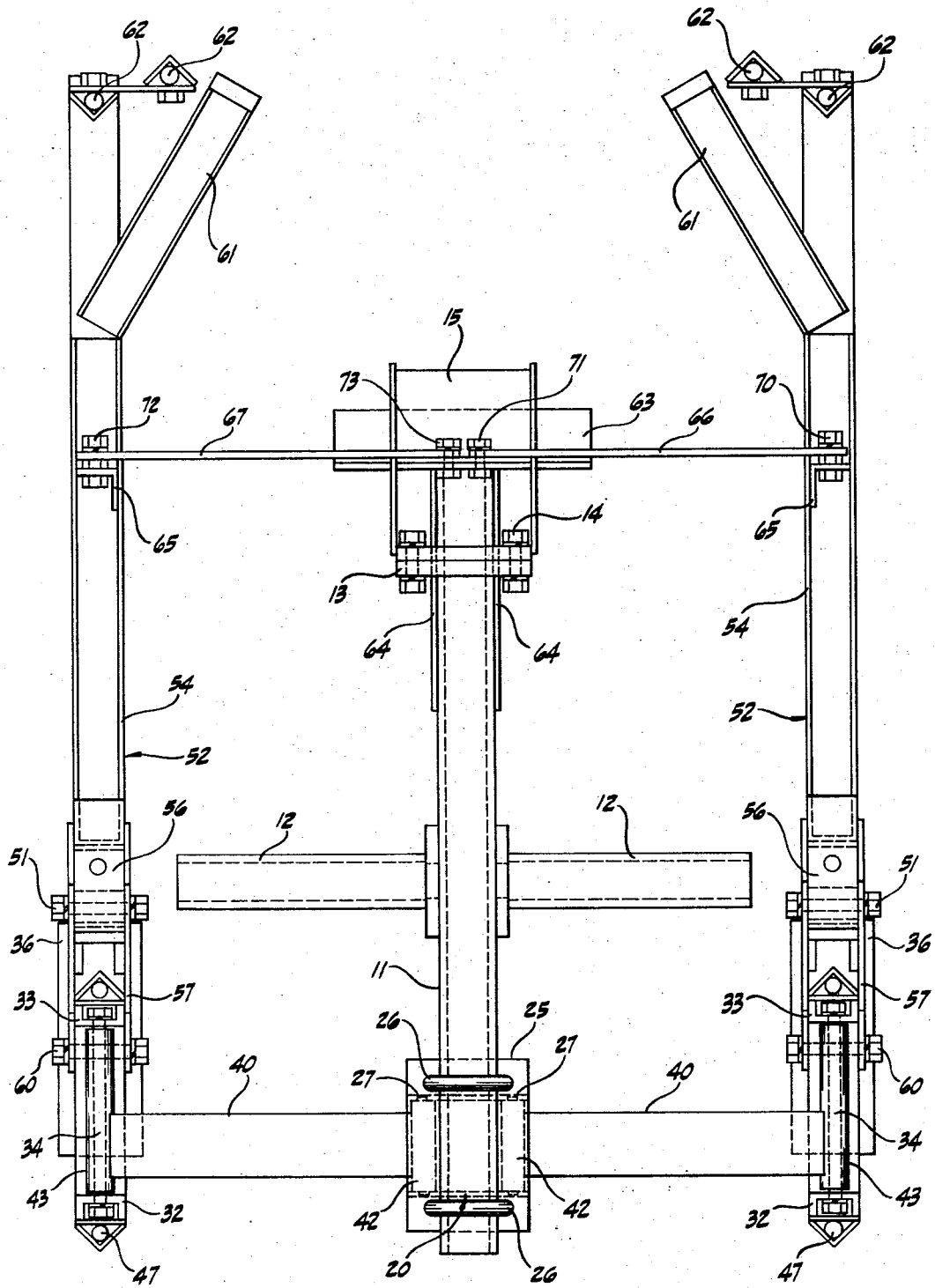
FIG. 3 is a top plan view thereof.

The cultivator is propelled in the usual manner by a vehicle such as a tractor and is connected to the tractor by a conventional hitch, as is well known. The cultivator includes the conventional cultivator frame generally indicated by 10, the frame 10 having a longitudinal extension frame member 11 extending generally in the direction of cultivator travel. Mounted on and extending laterally from each side of the frame member 11 is a side frame member 12 to which cultivator blades (not shown) are mounted. A bracket plate 13 secured to the end of the extension frame 11, is attached by bolts 14 to a rear mount 15 which carries the rearmost cultivator blade or sweep (not shown).

A cultivator gauge wheel 16 is mounted by the arms 17 to the extension frame 11 by the mounting plates 18. The gauge wheel 16 maintains the cultivator frame 10 at a predetermined height above the ground, and thereby determines the depth of cut made by the cultivator blades (not shown) carried by the extension frame member 11.

The cultivator assembly includes a mounting bracket 20 provided by front plate 21 and rear plate 22 interconnected by a substantially square tube 23. The bracket 20 also includes a top plate 24 and a bottom plate 25 interconnecting the front and rear plates 21-22. A pair of U-bolts 26 attached to the top bracket plate 24, embrace and secure the mounting bracket 20 to the cultivator extension frame 11. At each side of the mounting bracket 20 are a pair of substantially horizontal pivot members 27 and 28, the pivot members 27 and 28 being vertically spaced and extending between the front and rear bracket plates 21-22.

A side frame generally indicated by 30 is spaced laterally from each side of the mounting bracket 20, the side frame 30 being adapted for location at the sides of adjacent crop rows 31. Each side frame 30 includes a pair of substantially vertical post members 32 and 33 spaced in the direction of frame travel. A pair of substantially horizontal pivot members 34 and 35 extend between and interconnect the frame post members 32 and 33, the pivot members 34–35 being substantially vertically spaced. In the preferred embodiment, the front post member 32 is curved downwardly and rearwardly to meet and connect with the rear post member 33. Attached to the bottom of the post members 32–33 is a ground-engaging member 36. Specifically, the ground engaging member 36 consists of a slide plate that is attached by bolts 37 to the lower curved part of the front post member 32.

Interconnecting each side frame 30 to the mounting bracket, is a pair of spaced, substantially parallel wing arms 40 and 41. More particularly, the wing arm 40 includes one sleeve end 42 pivotally mounted on the pivot member 27 at one side of the mounting bracket 20, while its opposite sleeve end 43 is pivotally mounted on the pivot member 34 of the associated side frame 30. The other wing arm 41 includes a sleeve end 44 that is pivotally mounted on the pivot member 28 at the same side of the mounting bracket 20, while its opposite sleeve end 45 is pivotally mounted on the pivot member 35 of the same side frame 30. Each pair of cooperating wing arms 40 and 41 provides a parallelogram linkage that enables independent substantially vertical movement of the associated side frame 30 in response to ground contour as the ground-engaging member 36 rides on the ground.

A tension spring 46 is operatively connected to each side frame 30 and tends to exert an upward counterbalancing force on such side frame 30. The tension spring 46 extends between and interconnects the pair of cooperating parallel wing arms 40 and 41, the spring 46 having one end attached to the sleeve end 42 of wing arm 40 at the pivot member 27 on the bracket 20, while its opposite end ia attached to the sleeve end 45 of the wing arm 41 at the pivot member 35 on the side frame 30.

Mounted on the front post member 32 of the side frame 30 is a crop-treating device 47 such as a frame or spray nozzle, the crop-treating devices 47 treating adjacent crop rows 31.

At the lower rear end of each side frame 30 is a bracket 50 carrying a transverse pilot pin 51. Pivotally mounted on the pivot pin 51 is a fender generally indicated by 52, the fender 52 having a longitudinal base runner 53 and an upstanding longitudinal shield 54. A front fender support includes an L-shaped bracket 55 and an attached top plate 56. A pair of transversely spaced straps 57 are secured to the top plate 56 and extend forwardly past the rear post member 33 of the associated side frame 30. A cap screw and bushing assembly 60 interconnects the ends of the straps 57, and engage the rear post member 33 to limit pivotal connection of the fender 52 and maintain its assembly.

The rear end of each fender 52 includes an angularly related deflector shield 61, the deflector shields 61 of the respective fenders 52 converging rearwardly and tending to deflect the soil toward the center of the assembly and away from the adjacent crop rows 31.

Mounted on the rear of each fender 52 is a crop-treating device 62 such as a flame or spray nozzle directed toward the crop row 31 adjacent the associated fender 52. The nozzles of the crop-treating devices 47 and 62 are connected in the usual and conventional manner by supply lines to the particular source of material that is carried either by the tractor or cultivator, all as is well known. If the nozzles of the crop-treating devices 47 and 62 are of the flame type, they will be equipped with suitable and conventional ignition means.

A rear lift and support assembly serves to attach the fenders 52 directly to the cultivator frame 10. This support assembly includes a transverse, substantially L-shaped bracket 63 connected by a pair of arms 64 to the cultivator frame 10.

A brace means extends between and interconnects the fenders 52 rearwardly of the pivotal connection of the fenders 52 to the side frames 30, the brace means holding the fenders 52 in a predetermined laterally spaced relation.

The brace means includes a vertical support member 65 attached to each fender 52 and extending upwardly above the associated shield 54. A pair of cross bars 66 and 67 extend between and interconnect the vertical support members 65 with the bracket 63 of the support assembly. More particularly, one end of the cross bar 66 is pivotally connected by a pivot bolt 70 to the support member 65 of one fender 52 while its opposite end is pivotally connected to the bracket 63 by a pivot bolt 71. One end of the cross bar 67 is pivotally connected by a pivot bolt 72 to the support member 65 of the other fender 52, while the other end of the cross bar 67 is pivotally connected by pivot bolt 73 to the bracket 63. It will be understood that the pivotal connections of the cross bars 66–67 will permit independent and separate, substantially vertical movement of the respective associated fenders 52 as the fenders follow the ground contour, yet will maintain a rigid, predetermined lateral spacing of the fenders 52.

It is thought that the operation and functional advantages of the cultivator assembly have become fully apparent from the foregoing detail description of parts, but for completeness of disclosure, the usage will be briefly described. As the cultivator is moved through the field, the gauge wheel 16 is located between the crop rows 31, and the side frames 30 and the associated fenders 52 are located next to adjacent crop rows 31. The ground-engaging element 36 of each side frame 30 rides on the ground adjacent the crop row and follows the ground contour, the side frame 30 moving substantially vertically as permitted by the parallel linkage of wing arms 40 and 41. Each of the side frames 30 move independently and separately.

Similarly, the fenders 52 pivotally attached to the side frames 30 follow the ground contour and are free to move substantially vertically, separately and independently of each other.

The brace means provided by the cross bars 66–67 and their pivot connections to the fender support members 65 and the intermediate rear support bracket 63 will permit this independent, substantially vertical movement of the fenders 52 yet will hold the fenders 52 rigidly together and maintain their spaced relationship. The crop-treating devices 47 and 62 carried by the side frames 30 and fender 52 treat the crops of the adjacent rows 31 as needed.

I claim as my invention:

1. In a cultivator adapted to travel along and cultivate row crops:
   a. a cultivator frame,
   b. a mounting bracket secured to the frame,
   c. a side frame spaced laterally from each side of the mounting bracket, the side frames being adapted for location at the sides of adjacent crop rows, and the side frames having ground-engaging members for following the contour of the ground along the sides of adjacent crop rows,
   d. a pair of spaced, substantially parallel wing arms pivotally connected to each side frame and to the mounting bracket to provide a parallelogram linkage that enables independent, substantially vertical movement of the side frames in response to the ground contour, and
   e. means carried by the side frames for treating the adjacent crop rows.

2. In a cultivator as defined in claim 1, in which:
   f. a tension spring is operatively connected to each side frame and tends to exert an upward counterbalancing force on the side frame.

3. In a cultivator as defined in claim 2, in which:
   g. the tension spring extends between and interconnects the associated pair of parallel wing arms, the spring having one end attached to the uppermost arm adjacent the pivot connection of the uppermost arm to the mounting bracket and having the other end attached to the lowermost arm adjacent the pivot connection of the lowermost arm to the side frame.

4. In a cultivator as defined in claim 1, in which:
   f. each side frame includes:
      1. a pair of substantially vertical post members spaced in the direction of frame travel, and
      2. a pair of substantially horizontal pivot members extending between the post members, the pivot members being substantially vertically spaced,
   g. the mounting bracket includes at each side a pair of substantially horizontal pivot members, the said pivot members being substantially vertically spaced, and
   h. the pair of parallel wing arms connecting each side frame to the mounting bracket extend between and interconnect the pivot members of each side frame and the pivot members on the associated side of the bracket.

5. In a cultivator as defined in claim 4, in which:
   i. the cultivator frame includes a longitudinal frame member extending in the direction of travel, and
   j. means mounts the bracket to the front end of the longitudinal frame member.

6. In a cultivator as defined in claim 1, in which:
   f. a fender is attached to each side frame and extends rearwardly in the direction of travel, the fenders being adapted for location at the sides of the adjacent crop rows.

7. In a cultivator as defined in claim 6, in which:
   g. means pivotally connects each fender to its associated side frame for enabling substantially vertical movement of each fender to follow the ground contour.

8. In a cultivator as defined in claim 7, in which:
   h. brace means extends between and interconnects the fenders rearwardly of the pivotal connection of the fenders to the side frames, the brace means holding the fenders in a predetermined laterally spaced relation.

9. In a cultivator as defined in claim 8, in which:
   i. pivot means connect the brace means to the fenders for enabling separate and independent, substantially vertical movement of the fenders while maintaining the laterally spaced relationship of the fenders.

10. In a cultivator as defined in claim 8, in which:
    i. the brace means includes:
       1. a support member attached to the cultivator frame, and
       2. a pair of cross bars, each of which is pivoted to the support member, one of the cross bars being pivoted to one fender and the other cross bar being pivoted to one fender and the other cross bar being pivoted to the other fender.

11. In a cultivator adapted to travel along and cultivate row crops:
    a. a cultivator frame,
    b. a mounting bracket secured to the frame,
    c. a side frame spaced laterally from each side of the mounting bracket, the side frames being adapted for location at the sides of adjacent crop rows, each side frame having ground-engaging members for engaging and following the contour of the ground along the sides of adjacent crop rows,
    d. each side frame includes:
       1. a pair of substantially vertical post members spaced in the direction of frame travel, and
       2. a pair of substantially horizontal pivot members extending between the post members, the pivot members being substantially vertically spaced,
    e. the mounting bracket includes at each side a pair of substantially horizontal pivot members, the said pivot members being substantially vertically spaced,
    f. a pair of spaced, substantially parallel wing arms connecting each side frame to the mounting bracket, the pair of wing arms extending between and interconnecting the pivot members of each side frame to the pivot members on the associated side of the bracket and providing a parallelogram linkage, the parallelogram linkages enabling independent, substantially vertical movement of the side frames in response to the ground contour,
    g. means carried by the side frames for treating the adjacent crop rows,
    h. a cultivator gauge wheel carried by the cultivator frame and located substantially between the pair of laterally spaced side frames,
    i. a fender pivotally connected to each side frame, the fenders extending rearwardly in the direction of travel for location at the sides of adjacent crop rows, the fender being movable substantially vertically to follow the ground contour, and
    j. a brace means including:
       1. a support member attached to the cultivator frame, and
       2. a pair of cross bars, each of which is pivoted to the support member, one of the cross bars being pivoted to one fender and the other cross bar being pivoted to the other fender, the cross bars maintaining the fenders in laterally spaced relation and enabling separate and independent, substantially vertical movement of the fenders.

* * * * *